United States Patent [19]

Bible

[11] Patent Number: 5,694,716
[45] Date of Patent: Dec. 9, 1997

[54] ROOT FEEDING DEVICE AND ASSOCIATED ROOT FEEDING METHOD

[76] Inventor: George R. Bible, 1842 Lively Rd., Maryville, Tenn. 37801

[21] Appl. No.: 343,726

[22] Filed: Nov. 22, 1994

[51] Int. Cl.⁶ ........................................................ A01G 29/00
[52] U.S. Cl. ........................................... 47/48.5; 175/23
[58] Field of Search ............................... 47/48.5 R, 48.5 A; 175/23, 67, 403, 209

[56] References Cited

U.S. PATENT DOCUMENTS

| | | | |
|---|---|---|---|
| 576,953 | 2/1897 | Davis | 175/23 |
| 587,779 | 5/1897 | Barker | 175/67 |
| 797,531 | 8/1905 | Peters . | |
| 955,729 | 4/1910 | Welsh | 175/23 |
| 1,280,486 | 10/1918 | Kanst . | |
| 1,394,041 | 10/1921 | Robbins . | |
| 1,959,174 | 5/1934 | Moore | 175/67 |
| 2,380,721 | 7/1945 | Bridgen | 47/1 |
| 2,539,271 | 1/1951 | Rianda | 43/124 |
| 2,776,634 | 1/1957 | Morton | 111/92 |
| 2,820,671 | 1/1958 | McFarland | 299/83 |
| 2,875,713 | 3/1959 | Shoffner | 111/7.1 |
| 3,291,231 | 12/1966 | Kammer | 175/403 |
| 3,304,653 | 2/1967 | Zadarnowski | 47/48.5 |
| 3,613,310 | 10/1971 | Rynberk | 47/48.5 G |
| 3,900,962 | 8/1975 | Chan | 47/48.5 |
| 3,916,564 | 11/1975 | Crowell, Sr. | 47/48.5 |
| 4,170,948 | 10/1979 | Strickland | 47/48.5 G |
| 4,440,243 | 4/1984 | Howeth | 175/209 |
| 5,050,340 | 9/1991 | Seifert | 47/48.5 G |

FOREIGN PATENT DOCUMENTS

| | | | |
|---|---|---|---|
| 1395209 | 5/1988 | U.S.S.R. | 47/48.5 G |
| 453429 | of 0000 | United Kingdom | 47/48.5 G |

*Primary Examiner*—Terry Lee Melius
*Assistant Examiner*—Joanne C. Downs
*Attorney, Agent, or Firm*—Pitts & Brittian, P.C.

[57] ABSTRACT

A root feeding device for dispersing plant food or other substances into the soil. The root feeding device (10) includes a reservoir (12) for being implanted in soil and for receiving the plant food or other substances to be dispersed into the soil. The reservoir (12) defines a plurality of perforations (22) through which the plant food or other substance is dispersed. The device (10) also includes a water dispensing wand (26) for dispensing water under pressure which, in accordance with the method of the present invention, is used to bore a hole in the soil to facilitate the implantation of the reservoir (12) in the soil. A conduit (38) of the water dispensing wand (26) is received through the reservoir (12) and water dispensed from the conduit (38) erodes the soil, thereby producing a hole in the soil into which the reservoir (12) is carried. In accordance with the method of the present invention the water dispensing wand (26) is then removed from the reservoir (12) and the reservoir is filled with plant food or fertilizer.

2 Claims, 2 Drawing Sheets

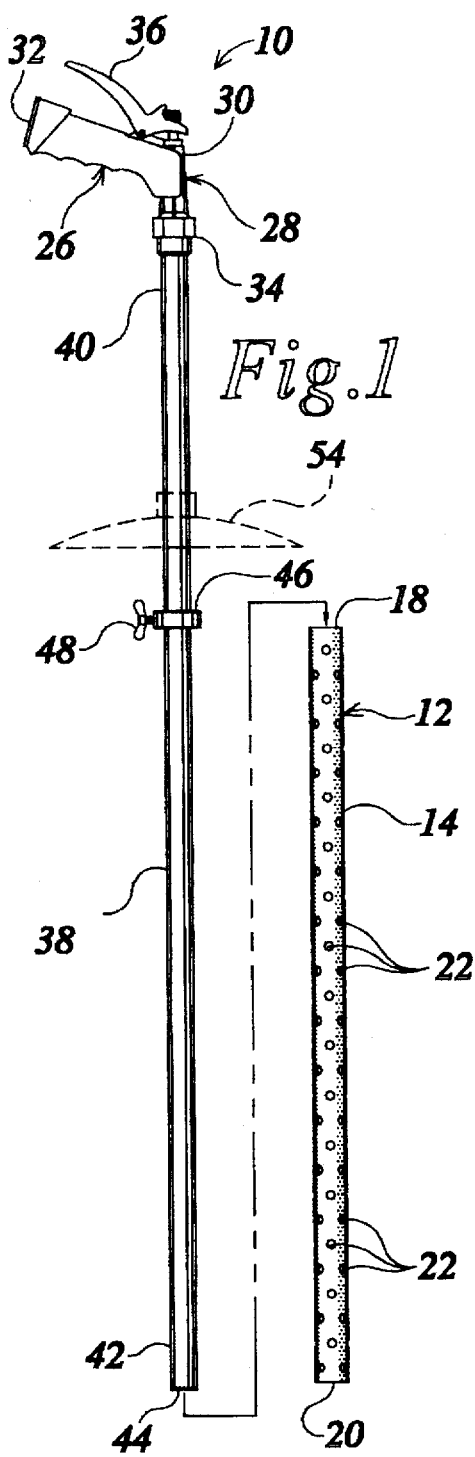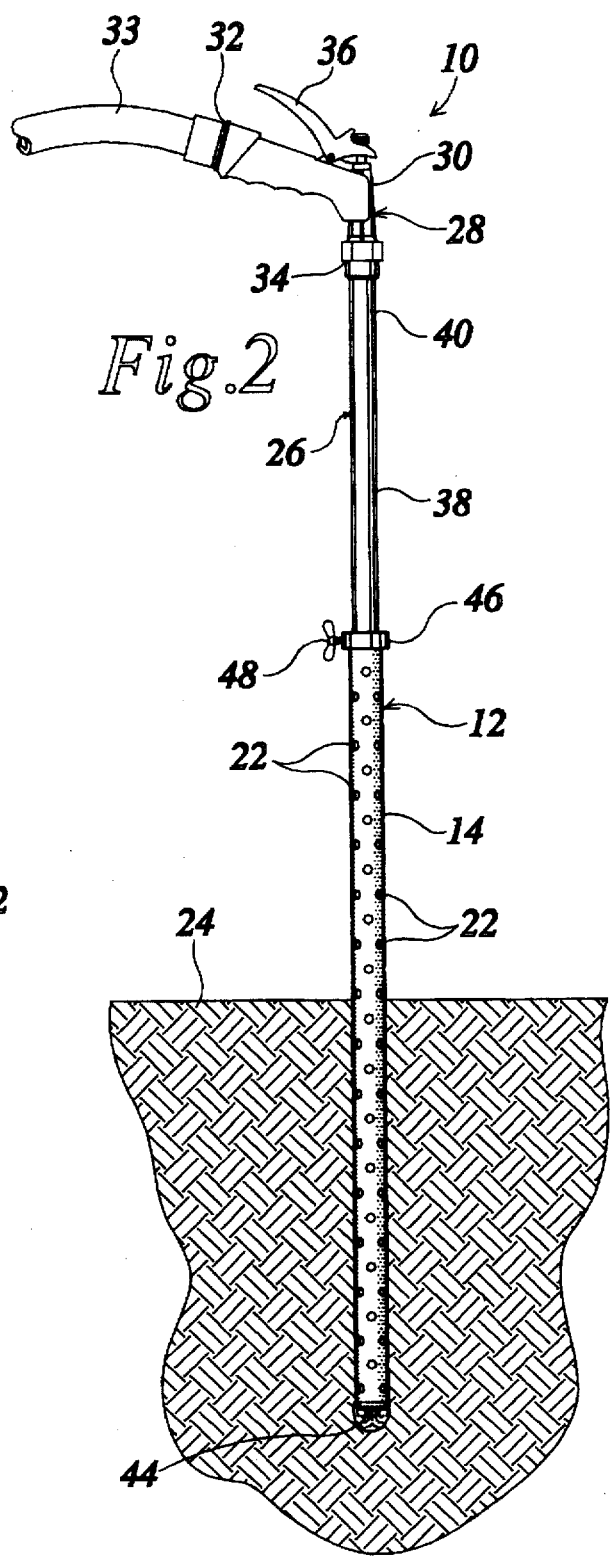

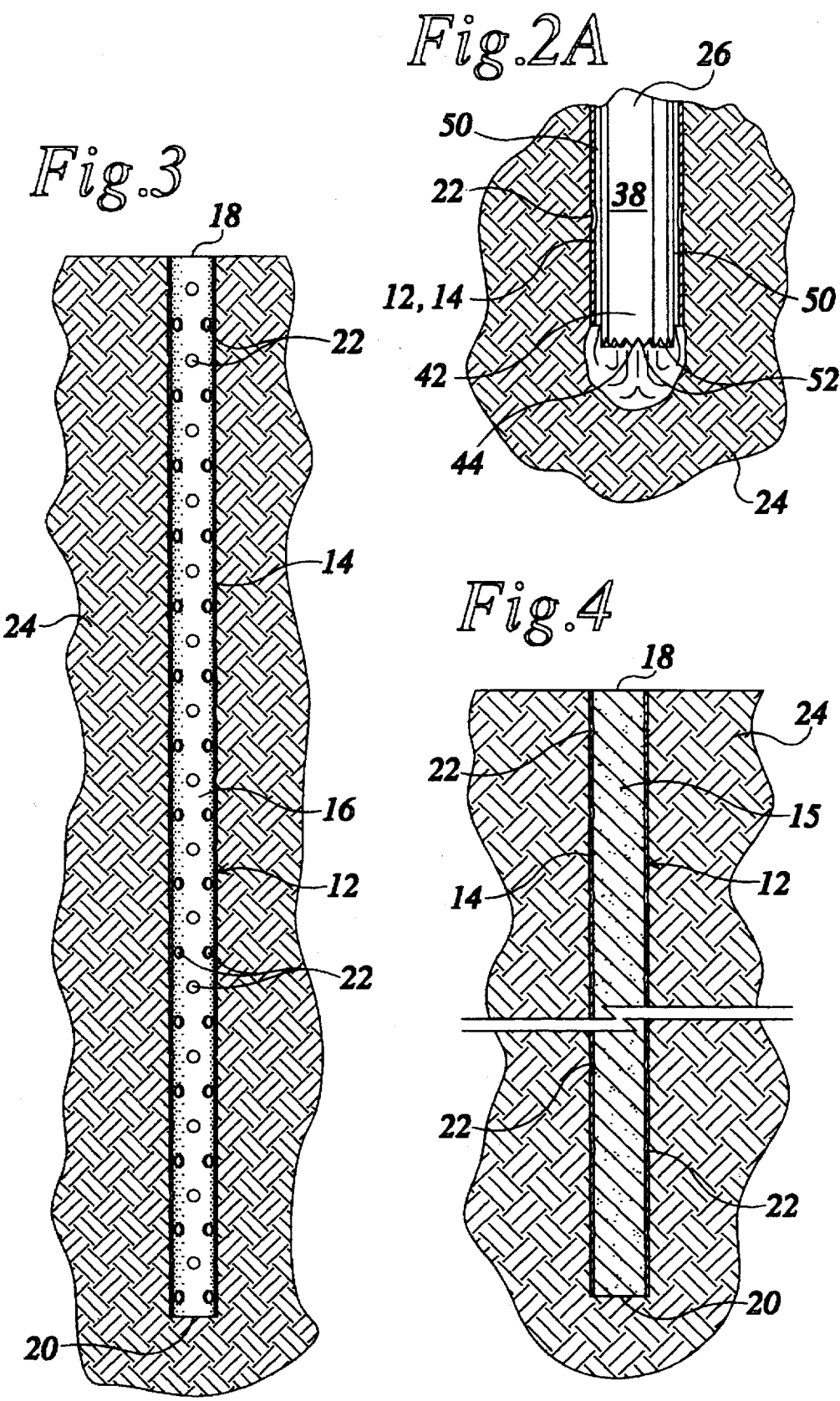

5,694,716

1

ROOT FEEDING DEVICE AND ASSOCIATED ROOT FEEDING METHOD

DESCRIPTION

1. Technical Field

This invention relates to a device and method for implanting a time-released fertilizer or plant food in the ground proximate a plant in order to supply such fertilized or plant food to the roots of the plant. In this particular invention the root feeding device includes a fertilizer reservoir for implanting in the ground and an elongated water dispensing wand to facilitate the implantation of the reservoir.

2. Background Art

It has long been recognized that the implantation of time-released fertilizers, plant foods, or other substances, in the soil proximate a plant is an efficient means for feeding substances to a plant. Accordingly, various containers and reservoirs have been devised to facilitated the implantation of fertilizers and other substances to be feed to the roots of a plant, and various implantation methods have been proposed. For example, various such containers, reservoirs and devices are disclosed in U.S. Patent Nos. 797,531; 1,280,486; 1,394,041; 2,380,721; 2,539,271; 2,776,634; 2,820,671; 2,875,713; 3,304,653; 3,900,962; and 3,916,564. However, in general these containers and reservoirs remain difficult to implant, and, once implanted, can be difficult to retrieve, and can be difficult, or impossible, to refill without removal from the soil.

Therefore, it is an object of the present invention to provide a device and method for implanting a time-released fertilizer, plant food, or other substances, in the ground proximate a plant in order to supply such substances to the roots of the plant.

It is another object of the present invention to provide a device and method for implanting a time-released fertilizer or plant food which incorporates a reservoir which is easy to implant.

Yet another object of the present invention is to provide a device for implanting a time-released fertilizer or plant food which incorporates a reservoir which can be refilled with fertilizer without being removed from the soil.

Still another object of the present invention is to provide a device for implanting a time-released fertilizer or plant food which incorporates a reservoir which can be easily retrieved from the soil.

Yet another object of the present invention is to provide a device for implanting a time-released fertilizer or plant food which is inexpensive to manufacture and maintain.

DISCLOSURE OF THE INVENTION

Other objects and advantages will be accomplished by the present invention which provides a root feeding device for dispersing plant food, fertilizer, or other substances, into the soil. The root feeding device includes a reservoir for being implanted in soil, with such reservoir defining a cavity for holding the plant food or other substance to be dispersed into the soil. The reservoir has a first end portion provided with a first opening and a second end portion provided with a second opening, and defines a plurality of perforations through which the plant food or other substance is dispersed. The device also includes a water dispensing wand for dispensing water under pressure which, in accordance with the method of the present invention, is used to bore a hole in the soil to facilitate the implantation of the reservoir in the soil. The water dispensing wand includes a conduit for being received through the cavity of the reservoir, the conduit having a distal end defining an outlet through which water under pressure is dispensed. Accordingly, the conduit of the water dispensing wand is received through the reservoir and water dispensed by the conduit erodes the soil, thereby producing a hole in the soil into which the said reservoir is carried. In accordance with the method of the present invention the water dispensing wand is then removed from the reservoir and the reservoir is filled with plant food or fertilizer. The plant food or fertilizer is subsequently dispersed though the perforations in the reservoir as such plant food or fertilizer is dissolved by ground water.

BRIEF DESCRIPTION OF THE DRAWINGS

The above mentioned features of the invention will be more clearly understood from the following detailed description of the invention read together with the drawings in which:

FIG. 1 illustrates an exploded side elevation view of the root feeding device of the present invention.

FIG. 2 illustrates a side elevation view of the root feeding device of the present invention.

FIG. 2A illustrates a partial side elevation view of the root feeding device of the present invention.

FIG. 3 illustrates a side elevation, in section, of a reservoir of a root feeding device of the present invention after implantation in the ground.

FIG. 4 illustrates a side elevation, in section, of a reservoir of a root feeding device of the present invention after it has been filled with fertilizer.

BEST MODE FOR CARRYING OUT THE INVENTION

A root feeding device of the present invention is illustrated generally at 10 in FIGS. 1 and 2. The root feeding device 10 is discussed hereinbelow as being use to implant fertilizer or plant food in the ground proximate one or more plants in order to dispense such fertilizer or plant food to the roots of such plants. However, it will be recognized that the feeding device 10 and the associated method of the present invention can be used to feed various substances to the roots of the plants, or to introduce various substances into the soil surrounding the roots of the plants to change the characteristics of such soil, such as, for example, substances for changing the pH level of the soil.

The root feeding device be includes an elongated reservoir 12 for being implanted in the soil near the plant or plants to be feed. In the preferred embodiment, the reservoir 12 comprises an elongated tubular body 14 defining a cavity 16 (see FIGS. 3–4) therein for receiving fertilizer 15, or other substances, to be dispensed into the soil, and having first and second end portions defining oppositely disposed openings 18 and 20 accessing the cavity 16. Further, the reservoir 12 is provided with a plurality of perforations 22 along its length for dispensing fertilizer or other substances contained within the cavity 16.

As illustrated in FIG. 3, the reservoir 12 is designed to be implanted in the soil 24 in a substantially vertical disposition, and, preferably, with the opening 28 being disposed at substantially ground-level such that no portion of the reservoir 12 extends above ground-level. As illustrated in FIG. 4, and in accordance with the method of the present invention, the fertilizer 15, or other substance, to be dispensed is received in the cavity 16 after the reservoir 12 has been implanted. Accordingly, ground water, communicated through the perforations 22, gradually dissolves the fertilizer 15 and causes it to be dispersed into the soil surrounding the reservoir 12.

In the preferred embodiment the reservoir 12 is fabricated of polyvinyl chloride or some other strong, corrosion-resistant thermoplastic. However, other strong, durable material may be used if desired.

In order to facilitate the implantation of the reservoir 12, the root feeding device 10 is provided with a water dispensing wand 26 for boring the hole in the soil into which the reservoir 12 is received. More specifically, the wand 26 includes valve assembly 28 including a valve housing 30 defining an inlet port 32 for being secured to a water supply hose 33, or other supply of water under pressure, and an outlet port 34, with flow-through communications being provided via a passageway within the housing 30 between the inlet port 32 and the outlet port 34. A conventional valve (not shown) is disposed within the housing 30 for selectively terminating the flow of water through the housing 30, with a valve actuator 36 being provided for actuating the valve. The wand 26 also includes a elongated conduit 38 having a proximal end 40 which is secured to the outlet port 34 of the valve housing 30 and a distal end 42 defining an outlet 44 out of which water under pressure is discharged.

In order to effect the implantation of the reservoir 12 in accordance with the method of the present invention, the conduit 38 is inserted into the opening 18, through the cavity 14, and preferably positioned such that the distal end 42 of the conduit 38 extends a short distance (e.g. 1"–2") beyond the open 20 of the reservoir 12. In this regard, in the preferred embodiment a stop member 46 is provided on the exterior of the conduit 38 which prohibits the reservoir from sliding toward the proximal end 40 of the conduit 38 once the desired positioning of the reservoir 12 relative to the conduit 38 is achieved. In the illustrated embodiment the stop member 46 defines a movable collar which can be selectively positioned along the conduit 38 and secured with a set screw 48. This allows the desired positioning of the reservoir 12 on the conduit 38 to be achieved using reservoirs 12 of varying length.

With the reservoir 12 positioned on the conduit 38, the distal end 42 of the conduit is placed against the ground, and the valve actuator 36 is depressed to initiate a jet of water from the outlet 44. The jet of water erodes away the soil, thereby boring a hole in the soil 24, as illustrated in FIG. 2. With the stop member 46 prohibiting upward movement of the reservoir 12, the reservoir 12 moves into the ground with the conduit 38, and is, thus, implanted in the ground. As best illustrated in FIG. 2A, the diameter of the conduit 38 is preferably smaller than the cross-sectional diameter of cavity 16, such that a space 50 is defined between the exterior of the conduit and the interior walls which define the cavity 16. During the implantation of the reservoir 12 the space 50 allows water and eroded soil to be channeled upward and out of the cavity 16 to facilitate the boring operation. Further, in the preferred embodiment the distal end of the conduit 38 is provided with a plurality of tooth members 52 which engage and break up the soil 24 when a wand 26 is rotated or pivoted about the longitudinal axis of the conduit 38. Accordingly, the implantation process can be facilitated by such rotating or pivoting of the wand 26.

It will also be recognized that during the implantation operation, water is discharged out of the perforations 22 which are disposed above the ground. Therefore, a splash guard 54 can be mounted on the conduit 38 as illustrated in FIG. 1, to prohibit the operator from being splashed with water.

After implantation of the reservoir 12, the conduit 38 is removed from the reservoir 12. Fertilizer or plant food is then poured into the cavity 16 through the opening 18. Such fertilizer or plant food is then dispersed into the soil 24 through the perforations 22 by ground water thereby feeding the plants in the proximity of the reservoir 12. Of course, after the fertilizer 15 within the reservoir 12 is depleted, the wand 26 can be used to clean out the cavity 16 and additional fertilizer 15 can be added. Further, the wand 26 can be used to loosen the soil around the reservoir 12 when removal of the reservoir 12 from the soil is desired.

In light of the above it will be recognized that the present invention provides a root feeding device and associated method having great advantages over the prior art. However, while a preferred embodiment has been shown and described, it will be understood that there is no intent to limit the invention to such disclosure, but rather it is intended to cover all modifications and alternate constructions falling within the spirit and scope of the invention as defined in the appended claims.

I claim:

1. A root feeding method for dispersing plant food into the soil in order to communicate the plant food to the roots of a plant, said method comprising the steps of:

inserting an elongated conduit of a water dispensing wand into a reservoir provided with a plurality of perforations for dispersing the plant food such that the reservoir is received about the elongated conduit;

injecting water through the elongated conduit of the water dispensing wand such that the water exits an outlet of the elongated conduit and erodes a hole in the soil, whereby the reservoir is carried downwardly into such hole with the water dispensing wand thereby implanting the reservoir in the soil;

removing the elongated conduit from the implanted reservoir; and filling the reservoir with the plant food to be communicated to the plant.

2. A root feeding method for dispersing plant food into the soil in order to communicate the plant food to the roots of a plant, said method comprising the steps of:

inserting an elongated conduit of a water dispensing wand into a reservoir provided with a plurality of perforations for dispersing the plant food such that the reservoir is received about the elongated conduit;

injecting water through the elongated conduit of the water dispensing wand such that the water exits an outlet of the elongated conduit and erodes a hole in the soil, whereby the reservoir is carried downwardly into such hole with the water dispensing wand thereby implanting the reservoir in the soil such that said reservoir is retained in the ground;

removing the elongated conduit from the implanted reservoir; and filling the reservoir with the plant food to be communicated to the plant.

* * * * *